United States Patent
Frijlink et al.

(10) Patent No.: US 10,301,441 B2
(45) Date of Patent: May 28, 2019

(54) PROCESS FOR ENHANCING THE MELT STRENGTH OF POLYPROPYLENE

(71) Applicant: Akzo Nobel Chemicals International B.V., Arnhem (NL)

(72) Inventors: Wilhelm Klaas Frijlink, Zwolle (NL); Leonardus Bernardus Gerhardus Maria Nijhof, Enter (NL)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 136 days.

(21) Appl. No.: 15/316,252

(22) PCT Filed: Jun. 9, 2015

(86) PCT No.: PCT/EP2015/062756
§ 371 (c)(1),
(2) Date: Dec. 5, 2016

(87) PCT Pub. No.: WO2015/189163
PCT Pub. Date: Dec. 17, 2015

(65) Prior Publication Data
US 2017/0145172 A1    May 25, 2017

(30) Foreign Application Priority Data

Jun. 12, 2014  (EP) .................................. 14172163

(51) Int. Cl.
*C08K 3/36* (2006.01)
*C08J 3/24* (2006.01)
*C08K 5/14* (2006.01)

(52) U.S. Cl.
CPC ............... *C08J 3/247* (2013.01); *C08K 3/36* (2013.01); *C08K 5/14* (2013.01); *C08J 2323/10* (2013.01); *C08J 2323/12* (2013.01)

(58) Field of Classification Search
CPC .................... C08K 3/36; C08J 3/247
See application file for complete search history.

(56) References Cited

U.S. PATENT DOCUMENTS

| 3,317,454 A | 5/1967 | Pedretti |
| 4,268,637 A | 5/1981 | Weldy |
| 6,103,833 A | 8/2000 | Hogt et al. |
| 6,323,289 B1 | 11/2001 | Hogt et al. |
| 6,429,246 B1 | 8/2002 | Rous |
| 2007/0078208 A1 | 4/2007 | Dluzneski |

FOREIGN PATENT DOCUMENTS

| EP | 0 402 100 A2 | 12/1990 |
| EP | 0 725 037 A1 | 8/1996 |
| EP | 0 785 229 A1 | 7/1997 |
| EP | 0 737 712 B1 | 7/1999 |
| GB | 2 353 038 A | 2/2001 |
| JP | 2000-516272 A | 12/2000 |
| JP | 2001-019773 A | 1/2001 |
| JP | 2004-217753 A | 8/2004 |
| JP | 2008-094918 A | 4/2008 |
| WO | 94/29372 A1 | 12/1994 |
| WO | 97/49759 A1 | 12/1997 |
| WO | 98/54249 A1 | 12/1998 |
| WO | 01/04200 A1 | 1/2001 |
| WO | 01/18074 A1 | 3/2001 |
| WO | 2005/092966 A1 | 10/2005 |

OTHER PUBLICATIONS

European Search Report issued in counterpart European Application No. 14172163.9 dated Dec. 19, 2014.
International Search Report and Written Opinion issued in counterpart International Application No. PCT/EP2015/062756 dated Aug. 5, 2015.
Keller, "Peroxide Curing of Ethylene-Propylene Elastomers," Exxon Chemical Company, presented at a meeting of the Rubber Division, American Chemical Society, Oct. 6-9, 1987, pp. 238-254.
Hoffmann, "Crosslinking Agents in Ethylene-Propylene Rubbers," Progress in Rubber and Plastics Technology, vol. 1, No. 2, Mar. 1985, pp. 18-50.
Hogt et al., Blowing Agents and Foaming Processes 2009, International Conference, 11th, Hamburg, Germany, May 19-20, 2009, Smithers Rapra Technology Ltd., Shrewsbury, UK.

*Primary Examiner* — Peter D. Mulcahy
(74) *Attorney, Agent, or Firm* — Matthew D. Kellam

(57) ABSTRACT

Process for enhancing the melt strength of polypropylene by heat treating said polypropylene at a temperature between 150° C. and 300° C. in the presence of 0.3-3 wt %, based on the weight of the polypropylene, of a dialkyl peroxydicarbonate having alkyl groups with 12-20 carbon atoms, wherein a hydrophilic silica with a silanol group concentration of at least 1.0 mmol Si—OH groups/g, as measured by $LiAlH_4$ titration, is added to said polypropylene before, during, or after said heat treatment, in a mole ratio Si—OH/dialkyl peroxydicarbonate of more than 0.5.

10 Claims, No Drawings

PROCESS FOR ENHANCING THE MELT STRENGTH OF POLYPROPYLENE

This application is a national stage filing under 35 U.S.C. § 371 of PCT/EP2015/062756, filed 9 Jun. 2015, which claims priority to European Patent Application No. 14172163.9, filed 12 Jun. 2014, the contents of which are each incorporated herein by reference in their entireties.

The invention pertains to a process for enhancing the melt strength of polypropylene using a peroxide.

Processes for improving the melt strength of polypropylene using a peroxide are known in the art. For instance, WO 99/027007 discloses a process which requires the use of a peroxydicarbonate. Several peroxydicarbonates are disclosed in this document, including dicetyl peroxydicarbonate and dimyristyl peroxydicarbonate.

The advantages of these particular long chain dialkyl peroxydicarbonates are, apart from their good performance in the process, their safety aspects and ease of handling. Both of them are in solid form and—in contrast to many other peroxydicarbonates—can be safely stored and handled at room temperature. In addition, they can be safely used in an extrusion process. Furthermore, their only volatile decomposition product is $CO_2$.

A disadvantage of dicetyl and dimyristyl peroxydicarbonates is, however, that their decomposition product—the long chain alcohols cetyl- and myristyl alcohol—tend to migrate to the surface of the resulting modified polypropylene. This phenomenon is called "blooming" and leads to the formation of white or glittering particles on the surface, leading to a non-uniform appearance of the polymer surface.

Blooming is often seen in apolar polymers crosslinked with di(ter-butylperoxyisopropyl)benzene. Examples of such polymers are EPM and EPDM. The compound migrating to the surface of the crosslinked polymer is di-isopropanolbenzene, which is a decomposition product of di(ter-butylperoxyisopropyl)benzene.

Many prior art publications deal with blooming of di-isopropanolbenzene and many anti-blooming agents have been proposed for this purpose. For instance, U.S. Pat. No. 4,268,637 uses phthalic anhydride. The phthalic anhydride is thought to react with the di-isopropanolbenzene during the crosslinking reaction, resulting in the formation of a material which is non-crystalline and does not migrate to the surface of the crosslinked polymer.

WO 01/18074, however, reported that phthalic anhydride itself was observed to cause blooming, and proposed the use of a copolymer with anhydride and/or acid groups instead.

Polyalcohols and polyalkylene oxides have also been proposed as anti-blooming agents for di-isopropanolbenzene; see U.S. Pat. No. 3,317,454, WO 2005/092966, and US 2007/0078208.

Blooming of $C_{12}$-$C_{20}$ alcohols in polypropylene has, however, not been described before. Evidently, a solution to this problem has not been disclosed either.

It is therefore an object of the present invention to provide a process which leads to polypropylene with high melt strength and reduced blooming of $C_{12}$-$C_{20}$ alkyl alcohol. More preferably, blooming of said alcohol is totally absent from the polypropylene.

This object is achieved by adding to the polypropylene a hydrophilic silica, i.e. a silica with a relatively high silanol group concentration.

In addition, this also leads to reduced fogging at high temperatures, which fogging is generally caused by evaporation of the alcohol from the polypropylene.

The invention therefore relates to a process for enhancing the melt strength of polypropylene by heat treating said polypropylene at a temperature between 150° C. and 300° C. in the presence of 0.3-3 wt %, based on the weight of the polypropylene, of a dialkyl peroxydicarbonate having alkyl groups with 12-20 carbon atoms, wherein a hydrophilic silica with a silanol group concentration of at least 1.0 mmol Si—OH groups/g, as measured by $LiAlH_4$ titration, is added to said polypropylene before, during, or after said heat treatment, in a mole ratio Si—OH/dialkyl peroxydicarbonate of more than 0.5.

The polypropylene to be modified by the process of the present invention can be a homopolymer of propylene or a random, alternating, or block co- or terpolymer of propylene and other olefins. Generally, a propylene copolymer or terpolymer will contain one or more other olefins, such as ethylene, butene, pentene, hexene, heptene, or octene, but it may also comprise styrene or styrene derivatives. The content of olefins other than propylene is preferably not more than 30 wt % of all monomers.

Polypropylene homopolymers and copolymers of propylene and ethylene are most preferred. It is also possible to use mixtures of polypropylene and polyethylene.

As mentioned above, blooming of long chain alcohols is a problem in apolar polymers. This blooming, i.e. migration to the surface, is due to the incompatibilty between the polar alcohol and the apolar polymer.

The polypropylene to be treated in the process of the present invention preferably is, therefore, not a polypropylene that has been grafted with a polar group-containing ethylenically unsaturated monomer, such as hydroxylethyl acrylate or hydroxyethyl methacrylate.

Nor is the object of the process according to the invention the grafting such monomer onto the polypropylene. In other words: the process according to the invention is preferably conducted in the absence of such monomer.

Furthermore, the process according to the invention is preferably conducted in the absence of water. More preferably, it is conducted in the absence of polar solvents in general (including alcohols). Polar solvents, such as water, will either migrate to the polypropylene surface or will bind to the silica, which will hinder the silica from acting as anti-blooming agent for the $C_{12}$-$C_{20}$ alcohol decomposition products.

The melting point of commercially available propylene homopolymer is about 160-170° C. The melting point of propylene copolymers and terpolymers is generally lower.

The molecular weight of the polypropylene used can be selected from a wide range. Indicative of the molecular weight is the melt flow index (MFI). Use may be made of a polypropylene having a MFI from 0.1 to 1000 g/10 min (230° C., 21.6 N). Preferably, use is made of a polypropylene having a MFI from 0.5 to 250 g/10 min.

The peroxydicarbonate to be used in the process of the present invention has the formula $CH_3$—$(CH_2)_x$—O—C(=O)—O—O—C(=O)—O—$(CH_2)_x$—$CH_3$, wherein x=11-19.

More preferably, the peroxydicarbonate is dicetyl peroxydicarbonate (x=15) or dimyristyl peroxydicarbonate (x=13). Most preferably, the peroxydicarbonate is dicetyl peroxydicarbonate.

One of the decomposition products that is formed and that remains in the polypropylene is the $C_{12}$-$C_{20}$ alcohol. These alcohols have a polar head and an apolar tail and tend to migrate to the surface of the apolar polypropylene, resulting in the formation of white or glittering particles on the polypropylene surface.

In the process of the present invention, hydrophilic silica acts as anti-blooming agent.

The silica to be used in the process of the present invention is hydrophilic, which means that it contains free hydroxyl (silanol) groups on its surface and has not been treated with a hydrophobizing agent, such as chlorosilanes (e.g. trialkyl chlorosilanes, dialkyl dichlorosilanes, alkyl trichlorosilanes), hexamethyldisilazane, trialkylsilanols, or other hydrophobizing agents know in the art.

Hydrophilic silicas include fumed or pyrogenic silica, precipitated silica, and silica gel. Precipitated silica is the most preferred.

The hydrophilic silica has a silanol group concentration of at least 1.0, preferably at least 1.25, more preferably at least 1.5, and most preferably at least 1.6 mmol Si—OH groups per gram silica.

This silanol concentration can be determined by LiAlH$_4$ titration, as described in EP-A 0725037, pages 8-9.

The silica is added to the polypropylene either before, during, or after the heat treatment in the presence of peroxydicarbonate. The silica is added to the polypropylene in a mole ratio Si—OH groups/peroxydicarbonate of more than 0.5, preferably more than 0.9, and most preferably more than 1.0. This ratio is preferably not more than 8.0, more preferably not more than 6.0, even more preferably not more than 4.0, and most preferably not more than 3.5. The number of Si—OH groups can be determined by LiAlH$_4$ titration, as mentioned above.

The process according to the present invention is suitably carried out in conventional melt mixing equipment. Preferably, an extruder is used. The use of an extruder allows modification of the polypropylene to be combined with pelletization. More preferably, use is made of a twin screw extruder.

The process of the present invention can be carried out as a batch process, a continuous process, or a combination thereof. A continuous process is preferred.

The dialkyl peroxydicarbonate and silica may be mixed with the polypropylene before the heat treatment. Alternatively, the dialkyl peroxydicarbonate may be added to the polypropylene during the heat treatment.

The silica can be added by mixing it into the PP powder prior to the heat treatment, or by separate dosing or side feeding to an extruder during the heat treatment.

It is preferred to add dialkyl peroxydicarbonate, silica, and polypropylene to the extruder at the same time, e.g. by using (a) feeder(s).

Alternatively, the silica may be added after the heat treatment using conventional ways of blending additives into polymers.

The screw speed of the extruder is preferably in the range 25-500 rpm. The temperature of the extruder should be above the melting temperature of the polypropylene.

The process of the invention is carried out at a temperature in the range of 150-300° C., more preferably 155-250° C., and most preferably 160-225° C.

The dialkylperoxydicarbonates to be used in the present invention are solid at room temperature and may be added to the polypropylene as water-based formulation (suspension), as solution, as dispersion in an inert solvent such as isododecane, in the form of flakes, as a powder, or as a masterbatch on an inert solid carrier.

In a preferred embodiment, the peroxydicarbonate and the silica are mixed prior to addition to the polypropylene. The advantage thereof is that silica can act as anti-caking agent for the peroxydicarbonate, meaning that the silica improves the flow behavior of the peroxydicarbonate powder.

The present invention therefore also relates to a solid formulation comprising dialkyl peroxydicarbonate and a hydrophilic silica; the hydrophilic silica concentration being 0.1-50 wt %, based on the combined weight of hydrophilic silica and dialkyl peroxydicarbonate (=the weight of hydrophilic silica+the weight of dialkyl peroxydicarbonate). Preferably, the hydrophilic silica concentration is 0.1-25 wt %, and most preferably 0.1-10 wt % based on the combined weight of hydrophilic silica and dialkyl peroxydicarbonate.

If desired, this formulation contains a polymer, e.g. polypropylene, preferably in combination with anti-oxidants and/or acid catchers (e.g. calcium stearate). Such polymer-containing formulation may have the form of a powder mixture of the individual ingredients, or of a masterbatch of peroxydicarbonate and silica in a polymeric matrix.

If the dialkyl peroxydicarbonate and the hydrophilic silica are added to the polypropylene to be modified in the form of a solid formulation comprising both components, it is still allowed to add an additional amount of silica to said polypropylene, i.e. additional to the silica already present in said solid formulation.

The quantity of dialkyl peroxydicarbonate to be used will depend on the desired degree of modification and on the type of polypropylene employed. Preferably, use is made of dialkyl peroxydicarbonate concentrations in the range of 0.3 to 3 g of peroxide per 100 g polypropylene, more preferably in the range of 0.5 to 2 g per 100 g polypropylene.

The residence time in the extruder is generally about 10 sec. to 5 min.

The extruded polymer may be further processed as known to one of ordinary skill in the art. For instance by using an underwater pelletizer. Alternatively, the extruded modified polypropylene is formed directly into a desired end product or is blended with another polymer. Examples of such other polymers are EPM and EPDM.

It is preferred to carry out the process of the present invention in an atmosphere of inert gas, such as nitrogen, carbon dioxide, or argon. Preferably, nitrogen is used.

The process of the present invention may be conducted in the presence of a co-agent in order to influence the melt flow index of the polypropylene and/or to enhance the degree of modification.

A co-agent is generally understood to be a polyfunctional reactive additive such as a polyunsaturated compound which will react rapidly with polymer radicals, will overcome steric hindrance and minimize undesirable side reactions. Further information about co-agents is set forth in *Rubber Chemistry and Technology*, Vol. 61, pp. 238-254 and W. Hofmann, *Progress in Rubber and Plastics Technology*, Vol. 1, No. 2, March 1985, pp. 18-50. The term "co-agent" has the same meaning as given in these publications.

The incorporation of an effective amount of one or more of these co-agents into the polypropylene, prior to or during the process of the present invention tends to influence the melt flow index and molecular weight of the modified polypropylene.

The polypropylene obtained from the process according to the present invention may be processed into an end product without any further adaptations, if so desired. The polypropylene can be processed into the desired end product in all kinds of ways known to the skilled person, with the processing conditions generally being dependent on the desired application.

Optionally, the polypropylene obtained by the process of the present invention may be purified, modified, moulded, or blended with other (polymer) materials, in one or more process steps, prior to its final processing. Thus, there may be modifications using another polymer or monomer in order to enhance the end product's compatibility with other materials.

Alternatively, the obtained polypropylene may be degraded to increase its processability and/or applicability.

If so desired, conventional adjuvants, in an amount known to one skilled in the art, such as antioxidants, UV-stabilizers, lubricants, antidegradants, foaming agents, nucleating agents, fillers, pigments, acid catchers (e.g. calcium stearate), and/or antistatic agents may be added to the polypropylene. These adjuvants can be added to the polypropylene before as well as during or after the process according to the invention. For example, a chemical blowing agent (e.g. azodicarbonamide) can be added or a physical blowing agent (e.g. a gas like nitrogen, carbon dioxide, butane, or isobutane) can be injected into an extruder in order to produce foamed polypropylene. A chemical blowing agent is preferably added before or after the modification; a physical blowing agent is preferably injected after the modification. Preferably, a stabilizer, e.g. one or more antioxidants, is added in order to deactivate any free radicals still present in the obtained polypropylene as well as any radicals which may be formed later from subsequent processing under air/oxygen. In a typical experiment, from 0.01 to 1.0 parts of an antioxidant per hundred parts of polypropylene are used.

The polypropylene obtained by the process according to the present invention may be further processed by, for example, foaming, foam moulding, injection moulding, blow moulding, extrusion coating, profile extrusion, cast film extrusion, blown film extrusion, or thermoforming.

EXAMPLES

Example 1

Extrusion 500 g of a homopolymer polypropylene powder (MFI=ca. 7 g/10 min), 10 g dicetyl peroxydicarbonate (Perkadox® 24 L; (2.0 phr), 0.5 g Irganox® 1010 antioxidant (0.1 phr), and the respective amounts of silica in powder form (see Table 1) were mixed in a bucket with a spatula, and subsequently on a bucket mixer for 10 min. The compounds were extruded on a Haake PolyLab OS RheoDrive 7 system fitted with a Haake Rheomex OS PTW16 extruder (co-rotating twin-screw, L/D=40), from Thermo Scientific, using following settings:

Temperature profile settings: hopper at 30° C., zone 1 at 160° C., zones 2-4 at 190° C., zones 5-6 at 200° C., zones 7-10 at 210° C.

Screw speed: 280 rpm.

Throughput: 1.4 kg/h, dosed by a Brabender gravimetric screw feeder type DDW-MD2-DSR28-10.

Nitrogen was purged at the hopper (3.5 L/min) and the die (9 L/min).

The extruded material was led through a water bath for cooling and granulated by an automatic granulator.

The obtained granules were dried overnight in a circulation oven at 60° C.

Sheet Preparation

From the dried granules, 1-mm sheets (and 100-μm films) were pressed between two PET foils and two outer metal plates, using a Fontijne 200 kN press at 190° C. and a Fontijne 400 kN press at 30° C. (to cool down again).

The applied conditions were:

| 1-mm sheets | 100-μm films |
|---|---|
| 22 g granules | 1.3 g granules |
| 1-mm mold of 17 × 8 cm | no mold |

Pressing conditions (successively):

| | |
|---|---|
| 1 min at 190° C./<50 kN | 1 min at 190° C./<50 kN |
| 1 min at 190° C./50 kN | 1 min at 190° C./50 kN |
| 3 min at 190° C./150 kN | 1 min at 190° C./150 kN |
| 1 min at 30° C./150 kN | 1 min at 30° C./150 kN |

Sheet Evaluation

The 1-mm sheets (and 100-μm films) were evaluated under a microscope. Sheets (and films) were stored for appropriate times in between the PET foils at 23° C.

The microscope used for visual comparison was a Stemi 2000-C Digital microscope from Carl Zeiss equipped with an Axio Cam Icc 3 Camera. A magnification of 32× was applied.

In the Tables below, "No" means that no blooming was observed; "yes" means that blooming was observed (as glittering particles).

Melt Flow Index

The melt flow index (MFI) was measured with a Goettfert Melt Indexer MI-3 according to ISO 1133 (230° C./2.16 kg load). The MFI is expressed in g/10 min.

Melt Strength

The melt strength (MS) was measured (in cN) with a Goettfert Rheograph 20 (capillary rheometer) in combination with a Goettfert Rheotens 71.97, according to the manufacturer's instructions using the following configuration and settings:

Rheograph:
Temperature: 220° C.
Melting time: 10 minutes
Die: capillary, length 30 mm, diameter 2 mm
Barrel chamber and piston: diameter 15 mm
Piston speed: 0.32 mm/s, corresponding to a shear rate of 72 s$^{-1}$
Melt strand speed (at start): 20 mm/s
Rheotens:
Acceleration of wheels (strand): 10 mm/s$^2$
Barrel to mid-wheel distance: 100 mm
Strand length: 70 mm Results The 1-mm sheets made from the extruded and dried compounds in Table 1 were evaluated for blooming 10 weeks after preparing the sheets.

TABLE 1

Compounds composition and results of modified PP

| peroxide (phr) | Silica type | SiOH mmol/g | silica (phr) | Si—OH/ perox. (mol/mol) | MFI (g/10 min) | Blooming after 10 weeks |
|---|---|---|---|---|---|---|
| None | None | | | 0 | 7.3 | No |
| 2.0 (Comp.) | None | | | 0 | 2.7 | Yes |
| 2.0 (Comp.) | Fumed (Aerosil 200) | 0.75 | 0.5 | 0.11 | n.m. | Yes |
| 2.0 (Comp.) | | | 2.0 | 0.45 | 2.9 | Yes |

TABLE 1-continued

Compounds composition and results of modified PP

| peroxide (phr) | Silica type | SiOH mmol/g | silica (phr) | Si—OH/ perox. (mol/mol) | MFI (g/10 min) | Blooming after 10 weeks |
|---|---|---|---|---|---|---|
| 2.0 (Comp.) | Precipitated (Sipernat 50S) | 2.9 | 0.5 | 0.45 | n.m. | Yes |
| 2.0 | | | 2.0 | 1.8 | 2.5 | No | n.m. = not measured

Example 2

Example 1 was repeated, except that different amounts of precipitated silica were used. The 1-mm sheets of the extruded and dried compounds in Table 2 were evaluated 2 weeks after preparing the sheets.

TABLE 2

Compounds composition and results of modified PP

| dicetyl peroxy-dicarbonate (phr) | Silica type | Silica amount (phr) | MFI (g/10 min) | Melt strength (cN) | Blooming after 2 weeks |
|---|---|---|---|---|---|
| None | None | 0 | 7.1 | n.m. | No |
| 2.0 (Comp.) | None | 0 | 2.8 | 7-8 | Yes |
| 2.0 | Sipernat 50S | 0.5 | n.m. | n.m. | Yes |
| 2.0 | | 1.0 | n.m. | n.m. | Yes |
| 2.0 | | 2.0 | 2.7 | 6.5-7.5 | No |
| 2.0 | | 4.0 | 3.1 | 4-6 | No |
| 2.0 | | 8.0 | 4.8 | n.m. | No | n.m. = not measured

The blooming results of Table 2 for the 1-mm sheets were confirmed by evaluation of the 100-μm films after two weeks.

Example 3

Example 1 was repeated, except that another homopolymer polypropylene powder grade was used (MFI=ca. 12 g/10 min). The 1-mm sheets of the extruded and dried compounds in Table 3 were evaluated for blooming 10 weeks after preparing the sheets.

TABLE 3

Compounds composition and results of modified PP

| peroxide (phr) | Silica type | SiOH mmol/g | silica (phr) | Si—OH/ perox. (mol/mol) | MFI (g/10 min) | Blooming after 10 weeks |
|---|---|---|---|---|---|---|
| None | None | | 0 | | 12.1 | No |
| 2.0 | Fumed (Aerosil 380) | 1.5 | 2.0 | 0.93 | 5.9 | No |
| 2.0 | Precipitated (Sipernat 50S) | 2.9 | 2.0 | 1.8 | 4.9 | No |

From the results in the Tables above, it is clear that blooming can be suppressed—while maintaining the decreased MFI and increased melt strength—by adding the right type and amount of hydrophilic silica.

The invention claimed is:

1. A process for enhancing the melt strength of polypropylene, said process comprising heat-treating said polypropylene at a temperature between 150° C. and 300° C. in the presence of 0.3-3 wt %, based on the weight of the polypropylene, of a dialkyl peroxydicarbonate having alkyl groups with 12-20 carbon atoms, and adding a hydrophilic silica with a silanol group concentration of at least 1.0 mmol Si—OH groups/g, as measured by LiAlH$_4$ titration, to said polypropylene before, during, or after said heat-treating, in a mole ratio Si—OH/dialkyl peroxydicarbonate of more than 0.9, wherein said process is conducted in the absence of water and in the absence of hydroxyethyl acrylate and hydroxyethyl methacrylate.

2. Process according to claim 1 wherein the mole ratio Si—OH/dialkyl peroxydicarbonate is more than 1.0.

3. Process according to claim 1 wherein the dialkyl peroxydicarbonate is dicetyl peroxydicarbonate or dimyristyl peroxydicarbonate.

4. Process according to claim 3 wherein the dialkyl peroxydicarbonate is dicetyl peroxydicarbonate.

5. Process according to claim 2, wherein the mole ratio Si—OH/peroxydicarbonate is in the range 1.0-8.0.

6. Process according to claim 5, wherein the mole ratio Si—OH/peroxydicarbonate is in the range 1.0-3.5.

7. Process according to claim 1 wherein the process is conducted in the absence of an ethylenically unsaturated monomer.

8. Process according to claim 1, wherein the process is conducted in an extruder.

9. Process according to claim 1, wherein the temperature is from 160 to 250° C.

10. Process according to claim 1 wherein the hydrophilic silica is added before or during the heat-treating.

* * * * *